Figure 3:
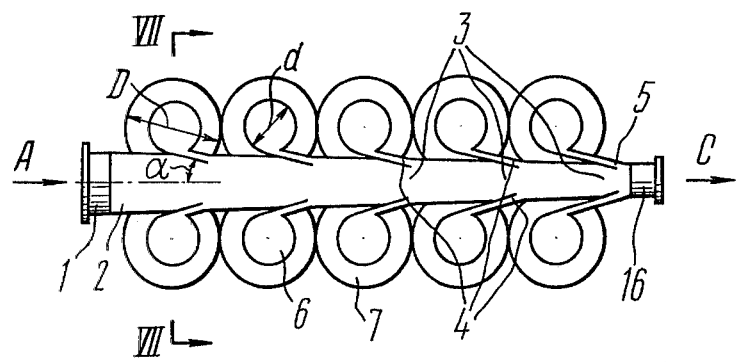
Figure 4:
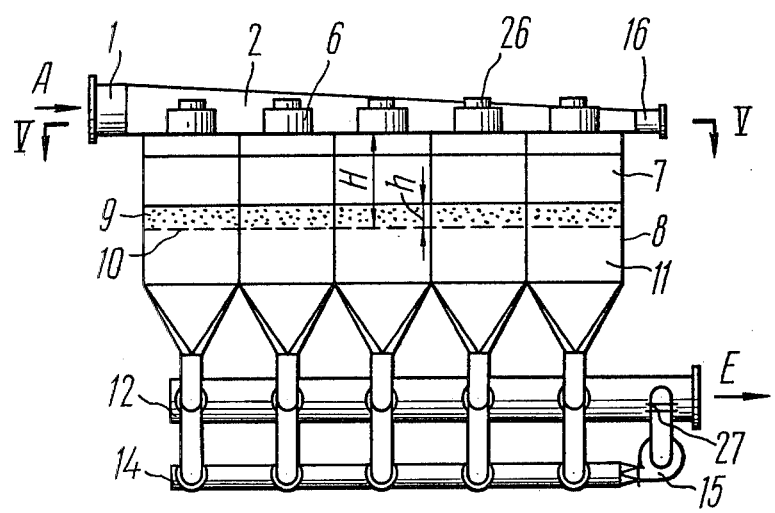
Figure 5:
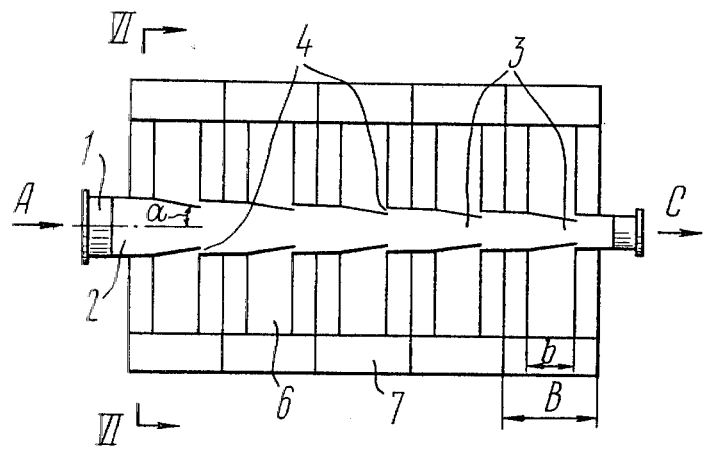
Figure 6:
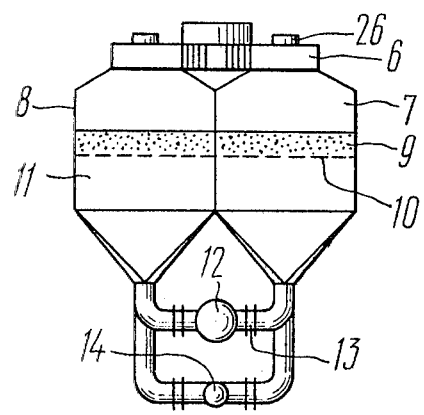
Figure 7:
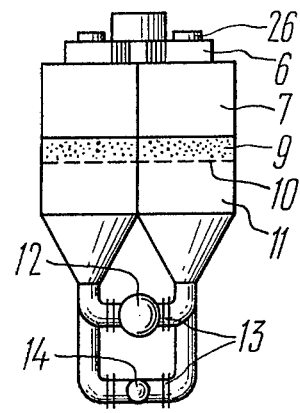

United States Patent [19]

Shopin et al.

[11] 4,295,867

[45] Oct. 20, 1981

[54] APPARATUS FOR SEPARATING CARBON BLACK FROM CARBON-BLACK AEROSOL

[76] Inventors: Viktor M. Shopin, ulitsa 50 let VLKSM, 3, kv. 8; Leonid G. Turenko, ulitsa ozero Khasan, 12; Vitaly F. Surovikin, ulitsa Lermontova, 20, kv. 80; Konstantin V. Suponev, prospekt Mendeleeva, 11, kv. 40, all of Omsk, U.S.S.R.

[21] Appl. No.: 46,650

[22] Filed: Jun. 8, 1979

[51] Int. Cl.³ .................. B01D 41/02; B01D 39/16
[52] U.S. Cl. ........................ 55/288; 55/96; 55/98; 55/303; 55/320; 55/337; 55/349; 55/350; 55/524; 55/340
[58] Field of Search ............ 55/62, 96, 98, 272, 55/288, 293, 303, 320, 337, 349, 350, 522, 387, 524, 340; 423/461

[56] References Cited

U.S. PATENT DOCUMENTS

| | | | |
|---|---|---|---|
| 2,533,991 | 12/1950 | Blomquist et al. | 55/349 |
| 2,546,246 | 3/1951 | Whiton et al. | 55/349 |
| 3,544,507 | 12/1970 | Lloyd | 55/387 |
| 3,868,237 | 2/1975 | Berz | 55/272 |
| 3,998,933 | 12/1976 | Henderson, Jr. | 55/98 |
| 4,026,687 | 5/1977 | Berz | 55/288 |
| 4,131,544 | 12/1978 | Elahi | 55/387 |

FOREIGN PATENT DOCUMENTS

| | | | |
|---|---|---|---|
| 544707 | 7/1956 | Belgium | 55/303 |
| 411911 | 7/1974 | U.S.S.R. | 55/349 |

*Primary Examiner*—David L. Lacey
*Attorney, Agent, or Firm*—Burton L. Lilling

[57] ABSTRACT

The herein-proposed apparatus for separating carbon black from a carbon-black aerosol stream comprises an apparatus in which a carbon-black aerosol is passed through a granular bed of carbon-black grains in a downflow manner. The carbon-black aerosol is separated into solid carbon-black particles that settle down in the granular bed of the carbon-black grains, and cleaned particulate-free gas delivered to the consumer. Part of said cleaned gas is periodically fed in a countercurrent flow to the stream of carbon-black aerosol to regenerate the granular bed of carbon-black grains. The apparatus for carrying this separation comprises a plurality of compartments, each being subdivided into a first and a second chamber through a partition web. Said partition web is a distribution grate with a screen, whereupon the granular bed of carbon-black grains is arranged, the screen having a mesh opening ranging from about 50 to about 200 microns. The first of the chambers communicates with the intake manifold for the carbon-black aerosol and with first shutoff devices. The ratio of the height of said granular bed of said carbon-black grains to the height of the first chamber is within 0.1 to 0.5. The second of the chambers communicates with the exit manifold for said cleaned gas, and with the manifold for admission of the regenerating gas, both manifolds being connected to second shutoff devices. The filter is provided with mechanical actuators for automatic control of said first and second shutoff devices.

7 Claims, 8 Drawing Figures

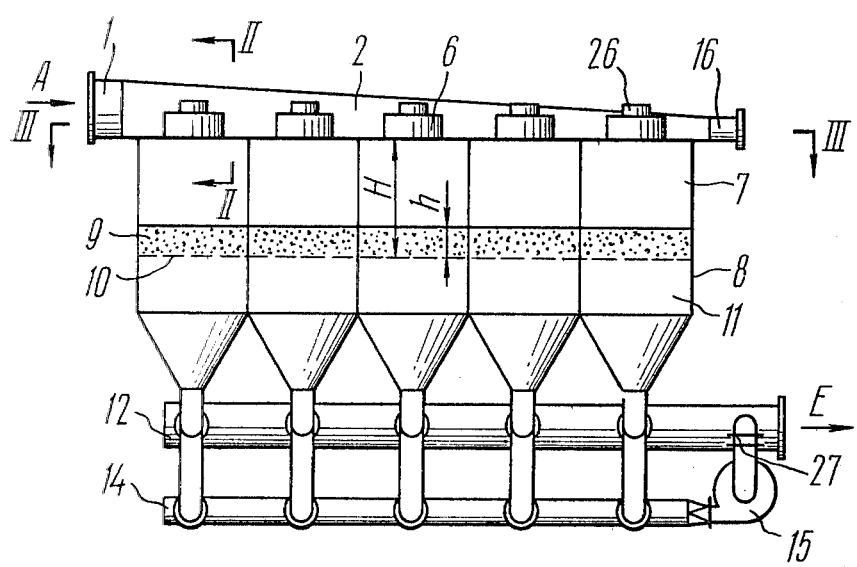
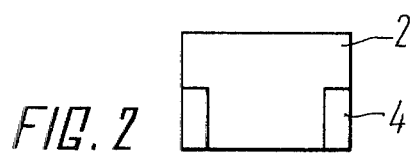

APPARATUS FOR SEPARATING CARBON BLACK FROM CARBON-BLACK AEROSOL

The present invention relates to a method of separating carbon black from a carbon-black aerosol and a filter for carrying same into effect, and can find application in such engineering industries that produce or make use of carbon black.

One of the prior art methods of separating carbon black from an aerosol comprises the carbon-black aerosol being passed through cloth or cermet filtering webs or partitions, whereby said aerosol is separated into solid carbon-black particles depositing upon the surface of the filtering material, and cleaned (particulate-free) gas fed to the consumer. Periodically part of the purified gas is recycled in a direction counterflow to the stream of carbon-black aerosol regenerate the filtering material.

The filter carrying said method into effect comprises a number of compartments each of which are subdivided into two chambers by a partition of filtering material, one of said chambers communicating with the intake manifold for entry of the carbon-black aerosol, while the other chamber is connected to the delivery manifold for cleaned gas to feed to the consumer, and to the regenerating gas intake manifold, said manifolds being connected to shutoff devices, as well as mechanical actuators for automatic control of said shut-off devices (cf. "Carbon-black Manufacture" by V. P. Zuyev and V. V. Mikhailov, Khimia Publishers, M. 1970, p.141; "Filter-Cleaning of Industrial Gases" by V. N. Uzhov and B. I. Maygkov, Khimia Publishers, M.1970, pp.208 through 221, 280 through 291 (both in Russian).

According to the known method of separating carbon black from an aerosol and the known filter for carrying same into effect, use is made of filtering materials whose effectiveness is variable with time. Damaged filtering webs that pass carbon-black particles are to be replaced periodically with new ones which involves high expense, incurs losses of carbon black and environmental pollution.

Another known method of separating carbon black from an aerosol thereof resides in carbon-black aerosol being passed through the granular bed of a filtering material, with the result that the carbon-black aerosol gets separated into carbon-black solids depositing upon the granular bed of the filtering material, and cleaned gas delivered to the consumer; periodically part of the purified gas is recycled in a direction counterflow to the stream of carbon-black aerosol regenerate the granular bed of the filtering material.

The filter for the realization of said method of separating carbon-black from an aerosol comprises a number of compartments each of which is subdivided by a partition web, containing the granular bed of a filtering material, e.g., quartz sand, into two chambers, the first of said chambers communicating with the intake manifold for the admission of the carbon-black aerosol, while the second chamber is connected to the manifold for cleaned gas to deliver to the consumer, and to that for feeding the regenerating gas, both of said manifolds communicating with shutoff devices, as well as mechanical actuators for automatic control of said shutoff devices (cf. "Filter-Cleaning of Industrial Gases" by V. N. Uzhov and B. I. Myagkov, Khimia Publishers, M.1970, pp.268 through 271; "Industrial Gas Cleaning and Aerodynamic Characteristics of Dust-Catching Apparatus", Yaroslavl, 1975, pp.99 through 106; A Symposium of Reports Delivered at Interregional Seminar on Gas Cleaning, Yaroslavl, 1972, pp. 77–78 (in Russian).

However, said method of separating carbon black from an aerosol and a filter for carrying the method into effect are costly due to losses of a valuable product, e.g., carbon black separated from its aerosol, contaminated by the granular bed products, such as fine particles of sand, as well as from a necessity of increased velocity and pressure of the gas for regenerating the quartz-sand granular bed. Moreover, said method of separating carbon black from an aerosol and a filter for carrying same into effect fail to attain fairly complete separation of carbon black from its aerosol, with resultant losses of that valuable product and contamination of the ambient environment.

It is an object of the present invention to provide a method of separating carbon black from a carbon-black aerosol that would be capable of practically complete separation of carbon black from its aerosol and would assure a high degree of purity of the carbon black separated, as well as a filter for carrying said method into effect.

It is another object of the present invention to reduce power consumption and expenditures involved in the process of separating carbon black from a carbon-black aerosol.

The essence of the present invention resides in a method of separating carbon black from a carbon-black aerosol, consisting in passing said aerosol through the granular bed of a filtering material to separate it into solid carbon-black particles that deposit upon said granular bed of the filtering material, and cleaned gas delivered to the consumer, and in periodically recycling part of the cleaned gas in a direction counterflow to the stream of carbon-black aerosol to regenerate the granular bed of the filtering material. According to the invention said granular bed of the filtering material is established by carbon-black grains through which a carbon-black aerosol is passed in a downflow manner.

Thus, a fairly complete separation of carbon black of high purity from an aerosol is achieved at minimum power consumption and cost.

It is expedient that the carbon-black aerosol be fed in a progressive or progressive-rotational flow.

The above feature precludes any possibility of the granular bed of carbon-black grains being carried away or destroyed and the efficiency affected, of carbon-black separation from an aerosol.

It is preferable to feed a carbon-black aerosol at a temperature of from zero to about 400° C. and a pressure of from about $(-500)$ kg/m$^2$ to about $(+500)$ kgf/m$^2$, with a rate of feed of said aerosol through said granular bed of carbon-black grains ranging from 0.05 to 0.5 m/s, the size of the carbon-black grains ranging between about 0.5 mm and about 2.5 mm and a bulk density ranging from about 300 kg/m$^3$ to about 1000 kg/m$^3$.

The ratio between the process parameters, size of carbon-black grains and its bulk density assures a most complete separation of carbon black from a carbon-black aerosol and reduces power consumption for carbon-black separation and regeneration of the bed of carbon-black grains.

Regeneration of the granular bed of carbon-black grains is expediently carried out every 5 to 60 minutes for a period of 20 to 60 seconds by passing cleaned gas through the granular bed of the filtering material at a rate of from 0.3 to 1.0 m/s.

This is instrumental in most efficiently separating carbon black from a carbon-black aerosol and in reducing power consumption for regenerating the bed of carbon-black grains.

It is quite reasonable that the carbon-black grains be filled with a polymeric material, e.g., polyethylene taken in a weight ratio of 5 to 50 parts of the polymeric material per 100 parts of the carbon-black grains, whereby the wear-resistance of said grains in the granular bed is increased and losses of carbon black are reduced.

In order to carry into effect the herein-proposed method of separating carbon black from a carbon-black aerosol use is made of a filter, comprising a number of compartments, each being subdivided into two chambers by a partition web carrying the granular bed of a filtering material, the former of said chambers communicating with an intake manifold for the carbon-black aerosol to enter, while the latter of said chambers communicates with a manifold for the cleaned gas to exit to the consumer and for the regenerating gas to enter, all the above-said manifolds being communicating with the respective shutoff devices, wherein according to the invention said partition web is in effect a distribution grate with a screen having a mesh size ranging from about 50 microns to about 200 microns, and the ratio between the height of the granular bed of a filtering material, e.g., carbon-black grains, and the height of the former chamber ranges within 0.1 to 0.5.

Such a constructional arrangement makes it possible to avoid losses of carbon black and ensure against destruction of the carbon-black grains during regeneration of the granular bed.

A cyclone chamber or rectangular prechamber should be provided between the intake manifold of the filter and the first chamber thereof, arranged coaxially with the latter and opening into the interior of said first filter chamber and connected to said intake manifold through a pipe union. It is also useful that the inside diameter of said cyclone chamber (or the smaller side of the rectangular prechamber) equals 0.2 to 1.0 of the inside diameter of the cylindrical first chamber (or the smaller side of the rectangular first chamber). This feature provides for the best conditions for a uniform spreading of the aerosol over the surface of the granular bed of the carbon-black grains and a most complete separation of carbon black from the aerosol being processed.

It is also favorable that the intake manifold of the filter be a duct having its cross-sectional area vary along its length and have a number of convergent sections which communicate with the prechambers through pipe unions connected to slitlike openings that are located in the vertical planes of the smaller bases of the convergent sections of said duct, the angle of convergence that is, the angle between the side wall of the converging portion of the manifold and the longitudinal axis thereof being expedient to vary from within 10 to 80°.

Such a feature enables one to assure carbon black separation from a carbon-black aerosol within a broad range of carbon-black input concentrations in the aerosol being processed, as well as to reduce power consumption for regenerating the bed of carbon-black grains.

BRIEF DESCRIPTION OF THE DRAWINGS

The present invention will be more apparent from a consideration of some specific embodiments thereof given below by way of illustration with reference to the accompanying drawings, wherein:

FIG. 1 is a schematic longitudinal-section view of a filter with cylinder-shaped chambers, for separating carbon black from a carbon-black aerosol, according to the invention;

FIG. 2 is a scaled-up view of a section taken along the line II—II in FIG. 1;

FIG. 3 is a section taken along the line III—III in FIG. 1;

FIG. 4 is a schematic longitudinal-section view of a filter with rectangular chambers, for a method of separating carbon black from a carbon-black aerosol, according to the invention;

FIG. 5 is a section taken along the line V—V in FIG. 4;

FIG. 6 is a section taken along the line VI—VI in FIG. 5;

FIG. 7 is a section taken along the line VII—VII in FIG. 3; and

FIG. 8 is a schematic view of a filter assembly for carrying into effect a method of separating carbon black from a carbon-black aerosol, according to the invention.

The herein-proposed method of separating carbon black from a carbon-black aerosol is carried into effect as follows.

A carbon-black aerosol having a temperature of from zero to 400° C. is fed at a pressure of from (−500) $kg/m^2$ to (+500) $kg/m^2$ in the direction of an arrow A to an inlet pipe 1 (FIG. 1) of a manifold 2 (FIGS. 1, 2), said inlet pipe having convergent sections 3 (FIG. 3) and a lengthwise variable cross-sectional area. Further on, the carbon-black aerosol is fed, through slitlike openings 4 located in the vertical planes of the smaller bases of each convergent section 3 and pipe unions 5, into prechambers 6, wherefrom said aerosol is directed, in the form of progressive or progressive-rotational flows, into chambers 7 of compartments 8 (FIG. 1). The prechambers 6 (FIG. 3) are so provided that a diameter "d" thereof makes up from 0.2 to 1.0 of a diameter "D" of the chamber 7. FIGS. 4, 5 and 6 illustrate an embodiment of the prechamber 6 and the chamber 7 having a rectangular cross-section, the ratio between a smaller side "b" of the prechamber 6 (FIG. 5) and smaller side "B" of the chamber 7 ranges within 0.2 to 1.0.

Then the carbon-black aerosol is fed from the chambers 7 (FIGS. 1, 4) at a rate of from 0.05 to 0.5 m/s in a downflow manner through the granular bed of a filtering material 9 established by carbon-black grains sized from 0.5 mm to 2.5 mm and having a bulk density of from 300 $kg/m^3$ to 1000 $kg/m^3$, said filtering material being arranged on a partition web 10 which is in effect a distribution grate provided as a screen having a mesh size ranging within 50 to 200 microns, the ratio of a height "h" of the granular bed of the filtering material to a height "H" of the chamber 7 being within 0.1 to 0.5.

Solid carbon-black particles settle down in the granular bed of the filtering material 9, while the cleaned gas through the partition web 10 is discharged into chambers 11 and a cleaned-gas manifold 12. Periodically (every 5 to 60 minutes ) a shutoff device 13 (FIG. 7) provided on one of the compartments 8 (FIG. 1), closes the outlet opening of the chamber 11 communicating with the manifold 12 and opens the inlet opening communicating with a regenerating gas manifold 14 for the period of from 20 to 60 seconds. As a result the cleaned gas is fed from the manifold 12 by a blower 15 into the manifold 14, and further on is passed at a rate of from 0.3 to 1.0 m/s through the partition web 10. The granular bed of the filtering material, i.e., the carbon-black grains 9 thus becomes suspended. The carbon black particles that have settled down in said bed are discharged along with the regenerating gas from the chamber 7 through the prechamber 6, the pipe union 5 and the slitlike opening 4 into the manifold 2 and is fed, along with part of the aerosol, through an outlet pipe 16 (FIG. 3) in the direction facing an arrow "C", into a cyclone separator 18 (FIG. 8) provided with a sluice valve 19.

The carbon black deposited in the cyclone separator 18, is fed through the sluice valve 19 to a granulator drum 20, while the gas is returned from the cyclone separator 18 to the inlet pipe 1 of the intake manifold 2 by virtue of a blower 21.

In 20 to 60 seconds the bed regeneration process is over, whereupon the shutoff device 13 closes the inlet opening of the chamber 11 communicating with the regenerating gas manifold 14 and opens the outlet opening for the cleaned gas to pass from the chamber 11 to the manifold 12. Next the process of regeneration of the granular bed of the filtering material is carried out consecutively in all the compartments 8 of the filter in a way similar to that described above. Then the gas cleaned in the filter, is fed to the consumer by a blower 22 (FIG. 8) along an arrow "E" (FIG. 1), whereas the end product, e.g., carbon-black grains are delivered through an elevator 23 along an arrow "F" to the storehouse.

To obtain carbon-black grains filled with a polymer material, such as polyethylene, said polymeric material is fed from a receptacle 24 provided with a metering device 25, into the gas duct running between the outlet pipe 16 and the cyclone separator 18, the polymer-to-carbon-black ratio being 5 to 50 weight parts per 100 weight parts, respectively.

Carbon-black grains are poured into the granular bed contained in the compartments 8, as fast as necessity arises, through charging hatchways 26 in the covers of the prechambers 6.

A necessity of charging carbon-black grains into the granular bed is judged by the hydraulic resistance offered by said bed at the moment of its regeneration, at a constant velocity of the gas fed under the bed and maintained automatically by the gate valve with an air actuator 27.

The hereinabove-described method of separating carbon black from a carbon-black aerosol will hereinafter be made clear in a number of specific embodiments thereof.

EXAMPLE 1

Figure 8:
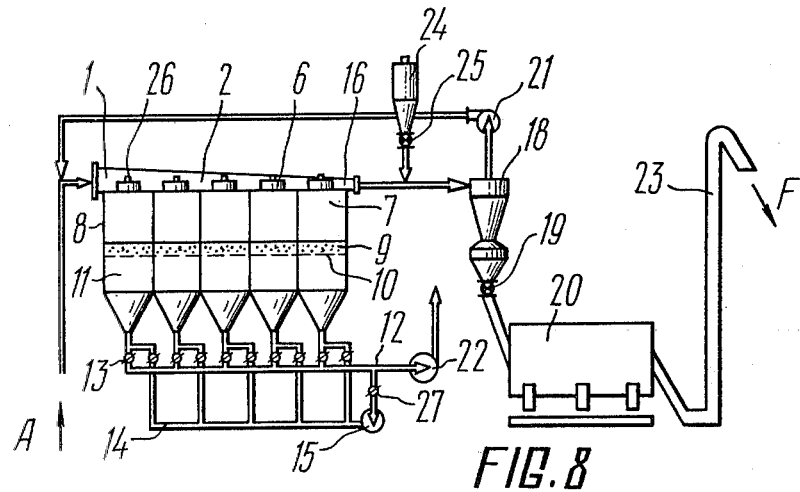

A carbon-black aerosol having a temperature of about 400° C. and a pressure of about ($-500$) kg/m$^2$, with a concentration of the carbon black in the aerosol of about 0.8 g/m$^3$, is fed to the inlet pipe 1 (FIG. 3) of the manifold 2 which has the convergent sections 3 with the angle of convergence equal to 10°, and further on through the openings 4 along the pipe unions 5 into the prechambers 6, where said aerosol is passed in the form of progressive-rotational flows into the chambers 7 of the compartments 8 (FIG. 8). The ratio between the diameter "d" of the cyclone prechamber 6 and the diameter "D" of the chamber 7 equals 0.2. Then the carbon-black aerosol is fed from the chambers 7 at a rate of 0.05 m/s through the granular bed of the carbon-black grains 9 having a grain size within 0.5 to 2.5 mm and a bulk density of 300 kg/m$^3$ arranged on the partition web 10 which is a distribution grate with a screen having a mesh size of 50 microns.

The ratio of the height "h" of the granular bed of the carbon-black grains 9 to the height "H" of the chamber 7 is adopted to be 0.1, the height of the bed of the carbon-black grains, 100 mm.

The carbon-black particles deposit upon the bed of the carbon-black grains 9, while the cleaned (particulate-free) gas is withdrawn through the partition web 10 into the chambers 11 and further on into the manifold 12. Regeneration of the granular bed is carried out after 60 minutes of operation with clean air fed through the shutoff device from the manifold 12 into the manifold 14 by the blower 15, by passing said air through the bed of the carbon-black grains at a rate of 0.3 m/s. The regeneration process takes 20 seconds to occur. The carbon-black particles deposited upon the granular bed, are discharged from the chambers 7 through the prechamber 6, the pipe union 5 (FIG. 3) and the slitlike openings 4 into the manifold 2 along with the regenerating air; further on said carbon-black particles are delivered to the cyclone separator 18 (FIG. 8) to settle down therein. The cleaned air is discharged by the blower 22 from the manifold 12 into the atmosphere. The carbon-black concentration in the cleaned air is within 10 mg/m$^3$.

EXAMPLE 2

A carbon-black aerosol having a temperature of about 200° C. and a pressure of about ($+250$) kg/m$^3$, with the carbon-black concentration in said aerosol being about 2.0 g/m$^3$, is fed to the inlet pipe 1 (FIG. 3) of the manifold 2 which has the convergent sections 3 with the angle of convergence equal to 45°, and further on through the openings 4 along the pipe unions 5 into the prechambers 6, from where said aerosol flows progressively into the chambers 7 of the compartments 8 (FIG. 8). The ratio between the lesser side "b" of the prechamber 6 and the smaller side "B" of the rectangular-section chamber 7 is adapted to be 0.6. The carbon-black aerosol is fed from the chambers 7 at a rate of 0.25 m/s to pass through the granular bed of the carbon-black grains 9 having a grain size within 1 to 2 mm and a bulk density of 450 kg/m$^3$, and arranged on the partition web 10 which acts as a distribution grate and which is provided as a screen having a mesh size equal to 100 microns.

The ratio of the height "h" of the bed of the carbon-black grains 9 to the height "H" of the chamber 7 is assumed to be 0.25, the height of the bed of the carbon-black grains, 100 mm.

The carbon-black particles are made to deposit upon the bed of the carbon-black grains 9, while the cleaned (particulate-free) gas is discharged through the partition webs 10 and the chambers 11 into the manifold 12. After 15 minutes of operation the bed of the carbon-black grains is subjected to regeneration with the cleaned gas fed by the blower 15 through the shutoff device 13 to the manifold 14, by passing said gas through the bed of the carbon-black grains at a rate of 0.5 m/s. The regeneration process takes 35 seconds to occur. The carbon-black particles that have settled down in the granular bed, are carried away along with the regenerating gas from the chambers 7 through the prechambers 6, the pipe unions 5 (FIG. 3) and the slitlike openings 4 into the manifold 2, and further on to the cyclone separator 18 (FIG. 8) to settle down therein. The cleaned gas is discharged by the blower 22 to the consumer.

The carbon-black concentration in the cleaned gas is within 20 mg/m$^3$.

EXAMPLE 3

A carbon-black aerosol at a temperature of about zero and a pressure of about (+500) kg/m$^2$, with the carbon-black concentration therein being about 3.2 g/m$^3$, is fed to the inlet pipe 1 (FIG. 3) of the manifold 2 which has the convergent sections 3 with the angle of convergence equal to 80°, and further on through the openings 4 along the pipe unions 5 into the prechambers 6, wherefrom said aerosol is supplied, in the form of progressive flows, into the chambers 7 of the compartments 8 (FIG. 8).

The ratio between the smaller side "b" of the prechamber 6 and the smaller side "B" of the chamber 7 equals 1.0. The carbon-black aerosol is fed from the chambers 7 at a rate of 0.5 m/s to pass through the granular bed of the carbon-black grains 9 having a grain size within 0.5 to 2.5 mm and a bulk density of about 1000 kg/m$^3$, and arranged on the partition web 10 which is in effect a distribution grate with a screen having a mesh size equal to 200 microns. The ratio of the height "h" of the bed of the carbon-black grains 9 to the height "H" of the chamber 7 is adopted to be 0.5, the height of the bed of the carbon-black grains, 100 mm.

The carbon-black particles are made to deposit upon the bed of the carbon-black grains 9, while the cleaned (particulate-free) gas is discharged through the partition web 10 and the chamber 11 into the manifold 12. After 5 minutes of operation, the bed of the carbon-black grains is regenerated with the cleaned gas fed by the blower 15 through the shutoff device 13 to the manifold 14, by passing said gas through the bed of the carbon-black grains at a rate of 1.0 m/s. The regeneration process takes 60 seconds to occur. The carbon-black particles that have deposited upon the granular bed, are carried away along with the regenerating gas from the chamber 7 through the prechambers 6, the pipe unions 5 (FIG. 3) and the slitlike openings 4 into the manifold 2, and further on to the cyclone separator 18 (FIG. 8) to settle down therein. The cleaned gas is discharged by the blower 22 to the consumer. The carbon-black concentration in the cleaned gas is within 10 mg/m$^3$.

EXAMPLE 4

A carbon-black aerosol at a temperature of about 120° C. and a pressure about (−300) kg/m$^2$, with the carbon-black concentration therein being about 2.0 g/m$^3$, is fed to the inlet pipe 1 (FIG. 3) of the manifold 2 which has the convergent sections 3 with the angle of convergence equal to 30° C., and further on through the openings 4 along the pipe unions 5 into the prechambers 6, wherefrom said aerosol is supplied, in the form of progressive flow, into the chambers 7 of the compartments 8 (FIG. 8).

The ratio between the smaller side "b" of the prechamber 6 and the smaller side "B" of the chamber 7 is assumed to be 0.6. The carbon-black aerosol is fed from the chambers 7 at a rate of 0.3 m/s to pass through the granular bed of the carbon-black grains 9 having a grain size of from 1 to 2 mm and prefilled with polyethylene with a weight ratio of 5 parts of polyethylene per 100 parts of the carbon-black grains, said bed being arranged on the partition web 10 which is in fact a distribution grate with a screen having a mesh size equal to 200 microns. The ratio of the height "h" of the bed of the polyethylene-prefilled carbon-black grains 9 to the height "H" of the chamber 7 is adopted to be 0.3, the height of the bed of the carbon-black grains, 100 mm.

The carbon-black particles are made to deposit upon the bed of the polyethylene-prefilled carbon-black grains 9, while the cleaned (particulate-free) air is discharged through the partition web 10 and the chambers 11 into the manifold 12. After 10 minutes of operation, the bed of the polyethylene-prefilled carbon-black grains is regenerated with the cleaned air fed by the blower 15 through the shutoff device 13 to the manifold 14, by passing said air through the bed of the carbon-black grains at a rate of 0.5 m/s. The bed regeneration process takes 30 seconds to occur.

The carbon-black particles that have deposited upon the granular bed, are carried away along with the bed regenerating air from the chamber 7 through the prechambers 6, the pipe unions 5 (FIG. 3) and the slitlike openings 4 into the manifold 2, and further on to the cyclone separator 18 (FIG. 8) to settle down therein. The cleaned air is discharged by the blower 22 into the atmosphere.

The carbon-black concentration in the cleaned air is within 20 mg/m$^3$.

EXAMPLE 5

A carbon-black aerosol at a temperature of about 100° C. and a pressure of about (+200) kg/m$^2$, with the carbon-black concentration therein being about 0.5 g/m$^3$, is fed to the inlet pipe 1 (FIG. 3) of the manifold 2 which has the convergent sections 3 featuring the angle of convergence equal to 60°, and further on through the openings 4 along the pipe unions 5 into the prechambers 6, wherefrom said aerosol is supplied, in the form of progressive flows, into the chambers 7 of the compartments 8 (FIG. ). The prechambers 6 and the chambers 7 have a square cross-section, with the ratio between the sides thereof being 1.0. The carbon-black aerosol is fed from the chambers 7 at a rate of 0.35 m/s to pass through the granular bed of the carbon-black grains 9 sized 0.5 to 2.0 mm and prefilled with polyethyelene with a weight ratio of 50 parts per 100 parts of the carbon-black grains, said bed being arranged on the partition web 10 which is in fact a distribution grate with a screen having a mesh size equal to 100 microns. The ratio of the height "h" of the bed of the grains 9 to the height "H" of the chamber 7 is adopted to be 0.2, the height of the bed of the grains, 150 mm.

The carbon-black particles are made to deposit upon the bed of the polyethylene-prefilled carbon-black grains 9, while the cleaned (particulate-free) air is discharged through the partition web 10 and the chamber 11 into the manifold 12. After 15 minutes of operation the bed of the polyethyelene-prefilled carbon-black grains is regenerated with the cleaned air fed by the blower 15 through the shutoff device 13 to the manifold 14, by passing said air through the bed of the grains at a rate of 1.0 m/s. The bed regeration process takes 40 seconds to occur. The carbon-black particles that have deposited upon the granular bed, are carried away along with the bed regenerating air from the chamber 7 through the prechambers 6, the pipe unions 5 (FIG. 3) and the slitlike opening 4 into the manifold 2, and further on to the cyclone separator 18, (FIG. 8) to settle down therein. The cleaned air is discharged by the blower 22 into the atmosphere. The carbon-black concentration in the cleaned air is within 15 mg/m$^3$.

What is claimed is:

1. A filtering system for separating carbon black from a carbon-black aerosol, comprising: a plurality of compartments, each compartment partitioned by a fixed screen, having a mesh size ranging from about 50 to about 200 microns, into first and second chambers, each of said screens supporting a granular bed of carbon black grains arranged on said screen; the ratio of the height of the granular bed of carbon black grains to the height of said first chamber being within 0.1–0.5; an intake manifold, for admission of the carbon-black aerosol, communicating with each said first chambers; first shutoff means, an exit manifold, for a cleaned discharge gas, communicating with each of said second chambers and with said first shutoff means, second shutoff means; an entry manifold, for a regenerating gas, communicating with each of said second chambers, said exit manifold and with said second shut off means; blower means communicating with said exit manifold to enable said regenerating gas to flow from said exit manifold through said entry manifold.

2. The filtering system o claim 1, also including a prechamber of rectangular cross section located between a first rectangular section chamber and the intake manifold, and arranged coaxially with said first rectangular cross section chamber, the smaller side of the prechamber being 0.2 to 1.0 times the smaller side of the first chamber.

3. The filtering system of claim 1, wherein the cross-sectional area of said intake manifold varies along its length and has a plurality of convergent sections communicating with said prechambers through openings located in the vertical planes of smaller bases of each of the convergent sections of said intake manifold, having an angle of convergence varying from 10 to 80 degrees.

4. The filtering system of claim 1, also including a cylindrical cyclone prechamber communicating with each of said first chambers and said intake manifold, each of said prechambers arranged coaxially with each of said first chambers, and communicating with the interior of each of said first chambers, the diameter of each of said cyclone prechambers being 0.2 to 1.0 times the diameter of each of the first chambers.

5. The filtering system of claim 1, wherein the carbon black grains are prefilled with a polymeric material.

6. The filtering system of claim 5, wherein the granular bed of carbon black grains are prefilled with the polymeric material in a weight ratio of 5 to 50 parts per 100 parts of said carbon black grains, arranged on said screen.

7. The filtering system of claim 6, wherein the polymeric material is polyethylene.

* * * * *